July 4, 1950  B. T. GROBOWSKI  2,513,310
LAWN MOWER
Filed April 29, 1946  5 Sheets-Sheet 2

INVENTOR.
Benny T. Grobowski.
BY
Corbett, Mahony & Miller
ATTORNEYS

July 4, 1950  B. T. GROBOWSKI  2,513,310
LAWN MOWER
Filed April 29, 1946  5 Sheets-Sheet 4

INVENTOR.
Benny T. Grobowski
BY
*Abbett, Mahoney & Miller*
ATTORNEYS

Patented July 4, 1950

2,513,310

UNITED STATES PATENT OFFICE 2,513,310

LAWN MOWER

Benny T. Grobowski, Newark, Ohio, assignor to The E. T. Rugg Company, Newark, Ohio, a corporation of Ohio Application April 29, 1946, Serial No. 665,868

14 Claims. (Cl. 56—249)

My invention relates to a lawn mower. It has to do, more particularly, with a lawn mower of improved rugged construction which is of such a nature that the various necessary adjustments for proper operation are facilitated.

In the prior art, various and sundry lawn mower structures have been provided. One disadvantage of prior art lawn mower structures is that they are of such a nature that relative distortion or "springing" of the supporting frame, the cutting reel, and the cutting bar often occurs upon striking objects in the grass, such as small stones and twigs. Springing of any of these parts obviously prevents proper operation of the mower and is generally impossible to correct properly. Another disadvantage of prior art structures resides in the fact that they usually include complicated structures for adjusting the mower to vary the depth of cut and for positioning the cutter bar relative to the cutter reel. Furthermore, these adjustments are difficult to make properly and accurately with such structures and tools usually must be employed. Also, with prior art structures, various operating parts are not sufficiently protected from clogging by grass and dirt.

One of the objects of my invention is to provide a lawn mower of an extremely rugged construction, which is of such a nature that distortion or springing of various parts, which tend to result from striking objects such as stones or twigs, will be precluded.

Another object of my invention is to provide a lawn mower wherein the cutting reel and cooperating cutter bar are both supported by the same rugged frame unit so that there will be no danger of relative displacement or distortion during operation of the mower.

Another object of my invention is to provide a lawn mower having a simple yet effective structure for quickly and easily adjusting the mower to vary the depth of cut, such adjustment being accomplished without the use of wrenches, screw drivers or other tools.

Another object of my invention is to provide a simple, effective and easily operable structure in a lawn mower for adjusting the cutting reel and the cutter bar accurately relative to each other, such adjustment also being accomplished without the use of tools.

Another object of my invention is to provide a lawn mower of the general structure referred to above but which may be designed to operate as a manually pushed type or as a power driven type, it being of such a structure that the power unit and necessary connections can be built into the mower without interfering with the adjusting structures provided for varying the height of cut and for adjusting the cutting reel and cutter bar relative to each other.

Still another object of my invention is to provide a lawn mower which is so constructed that the various operating parts thereof are completely and effectively protected from clogging by grass or dirt.

Various other objects will be apparent hereinafter.

In its preferred form, I provide a lawn mower in which extreme rigidity is accomplished by providing a transversely extending yoke or frame unit which supports both the cutting reel and the cutter bar in rigid association with each other. The cutter bar is rigidly carried on the bottom portion of the yoke or frame and removably carries a knife which preferably has forward and rearward cutting edges and can be reversed readily so that either edge can be used. This yoke further serves to aid in connecting together rigidly, insofar as lateral movement is concerned, the side plates of the mower which, in turn, rigidly carry the axles for the supporting wheels. The side plates also carry the transversely extending ground-engaging roller at a point near their rear ends and behind the yoke. Forward of the yoke there is also provided a transversely extending bumper bar which has its ends rigidly connected to the side plates.

The cutting reel is provided with the usual shaft which is supported in bearings, carried by the vertical arms of the yoke, so that it is substantially parallel to the cutter bar. For accurately adjusting the knives of the cutting reel relative to the knife carried by the cutter bar, an adjustable eccentric is associated with the bearing provided at each end of the cutting reel shaft. Each of these eccentrics may be easily and quickly rotated by means of a worm and gear structure associated therewith which may be actuated by a rotatable knob conveniently located. Adjustment of the eccentrics will move the cutting reel shaft vertically relative to the cutter bar and, consequently, the cutting knives of the cutting reel will be adjusted accurately relative to the knife carried by the cutter bar. Furthermore, either end of the cutting reel shaft may be adjusted independently of the other. Due to the provision of the worm and gear in each of the end adjusting structures, the structure will be self-locking.

In order to provide for proper adjustment to vary the depth or height of cut of the cutting reel and associated cutter bar knife, I provide means for quickly and easily adjusting the entire assembly, which includes the yoke and the cutting reel and cutter bar carried thereby, vertically relative to the wheels. This is accomplished by providing a gear segment in association with each of the side plates which is pivoted for vertical movement on the wheel-supporting axle. Each end of the yoke is rigidly fastened to one of these gear segments and will, consequently, move therewith. In order to swing the gear segments vertically and, in turn, move the yoke vertically, a pinion is associated with each gear segment. The two pinions are associated with the lower ends of the pivoted arms of the handle structure used in pushing and guiding the mower. A lock is associated with each pinion and may be moved into one position, where it locks the pinion and prevents rotation thereof, or into a second position, where it locks the pinion to the handle arm, so that when the handle is swung vertically, the pinion will be rotated. Rotation of the pinions will move the gear segments vertically and since they carry the yoke which supports the cutting reel and cutter bar, these members will be adjusted vertically relative to the supporting wheels so as to vary the depth of cut.

If the mower is to be designed as a power driven unit, I provide a transversely extending drive shaft carried by the side plates and serving to drive the wheels. A power unit is mounted intermediate the side plates and is supported by a plate which has its ends connected to the side plates. A worm drive extends from the power unit to the drive shaft.

The foregoing and other objects and advantages of the present invention will appear from the following description and appended claims when considered in connection with the accompanying drawings forming a part of the specification wherein like reference characters designate corresponding parts in the several views and wherein:

Figure 1:
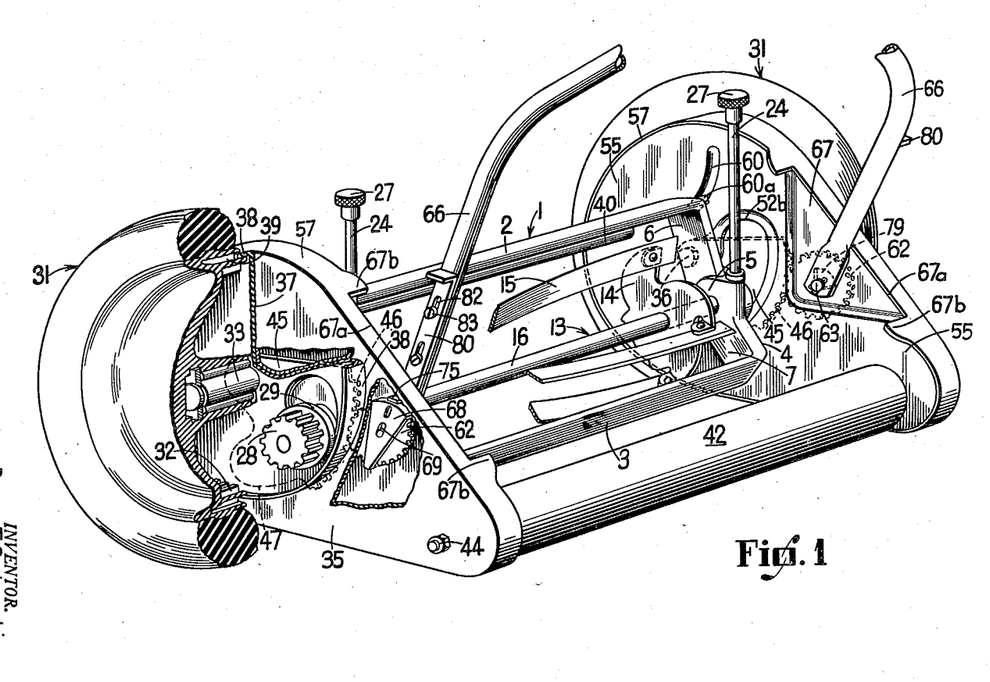
Figure 1 is a perspective view, partly broken away, of a lawn mower constructed in accordance with my invention.

With reference to the drawings, I have illustrated my lawn mower as comprising a one-piece frame unit 1 which may be termed a yoke. This yoke 1 (Figures 1 and 2) is rigidly cast in one piece and preferably consists of a top bar 2, a bottom cutter bar 3 and vertically disposed connecting side arms 4. The bars 2 and 3 extend transversely substantially the full width of the mower and are integrally joined to the arms 4 at the ends thereof. The arms 4 have bearing cups 5 (Figures 4, 5 and 6) cast therein and these cups have their interiors machined properly to receive the bearings. The upper portion 6 of each arm 4 extends substantially vertically above the bearing cup 5 while the lower portion 7 of each arm is inclined rearwardly. The cutter bar 3 is provided with a lower flat surface 8, which is substantially horizontally disposed, against which is secured, by means of a plurality of longitudinally spaced clamping screws 9, a cutter knife 10. The knife 10 (Figures 2 and 5) is provided with a forward cutting edge 11 and a rearward cutting edge 12 and can be reversed readily so that either edge can be used.

The yoke 1 supports a cutting reel 13 which is of usual construction and which includes the spiders 14 which carry the reel cutter knives 15. The spiders 14 are carried by a shaft 16, the ends of which extend into the bearing cups 5 (Figures 4 and 6) which contain the ball bearing units 17 that rotatably support the shaft. For accurately adjusting the cutting reel knives 15 relative to the cutter bar knife 10, an adjustable eccentric 18 is associated with each of the ball bearings 17 and is rotatably disposed in the bearing cup 5. The eccentric has an outer cylindrical surface which rotatably fits in the bearing cup 5 and has an inner socket 19 which is located eccentrically of the bearing cup and which receives the ball bearing 17. The end of the shaft 16 extends through an enlarged opening 20 at the inner side of the cup 5 so that the shaft may move laterally relative to the cup. The shaft fits rotatably but tightly in an opening 21 formed in member 18 and which is eccentric thereof. The shaft passes centrally through the ball bearing 17. Thus, it will be apparent that when the eccentric 18 is rotated, the shaft will be moved in such a manner that its axis moves laterally of the bearing cup 5. To rotate the eccentric 18 and produce this movement, the eccentric has a worm gear portion 22 formed on its inner side. This portion 22 is engaged by a worm 23 (Figures 5 and 6) which is formed on the lower end of a vertically disposed worm shaft 24. The worm 23 and shaft 24 are disposed in a vertical socket 25 formed as a part of the bearing cup 5 and which is disposed substantially tangential to the inner part of the bearing cup. The lower end of shaft 24 is rotatably mounted in a nut 26 that is threaded into the upper end of the socket 25 and in a socket 26a at the bottom of socket 25. The inner end of nut 26 engages the upper end of worm 23 and thus prevents upward movement of the shaft. The upper end of the shaft 24 is provided with a knurled knob 27 (Figures 1 and 2) and it will be noted that the shaft extends upwardly a sufficient distance so that this knob will be located well above the bar 2 of the yoke 1 so that the knob can be rotated conveniently.

It will be apparent that either of the eccentrics 18 can be actuated to adjust the corresponding end of the shaft 16 vertically and that such adjustment can be accomplished conveniently and easily without the use of tools. Because of the worm and gear, the adjusting structure will be self-locking. The structure at each end of the shaft may be actuated independently of the other. This adjustment will move the entire cutting reel 13 vertically so that the knives 15 thereof may be adjusted closely relative to the knife 10 carried by the cutter bar. Thus, either end of the cutting reel may be adjusted independently of the other and with precision.

The shaft 16 has a pinion 28 (Figures 4 and 6) disposed on each end thereof. These pinions 28 are loosely disposed on the shaft. Each pinion has a clutch housing 29 formed on its inner end. Each of the housings 29 receives a clutch unit 30 which is of a type in common use. This clutch will serve to rotate the shaft 16 when the pinion 28 is rotated in one direction, but will not drive the shaft upon rotation of the pinion in the opposite direction.

The opposite ends of the shaft 16 extend into the supporting and driving wheels 31 and each of the pinions 28 is driven by means of an internal ring gear 32 (Figures 3 and 4) formed in each wheel. Each of the wheels 31 is of the structure disclosed in the copending application of Benny T. Grobowski, Serial No. 649,075, filed February 20, 1946, which issued as Patent No. 2,432,621 on December 16, 1947, and, therefore, need not be described in detail in this application. As shown best in Figure 3, each wheel 31 is carried by a stub axle 33. This axle is provided with a reduced threaded inner end 34 which extends through an opening formed in the vertically disposed side plate 35 of the mower. The axle 33 is clamped to the plate 35 by means of a clamping nut 36 threaded on the portion 34 of the axle. Outside each plate 35 a cover plate 37 is vertically disposed in abutting relationship thereto, the axle 33 also passing through an opening in this plate. This plate 37 is provided with an outwardly projecting peripheral flange 38 which extends into an annular groove 39 formed in the periphery of the wheel 31. Thus, the wheel is free to rotate relative to the plate 37, but the flange extends into the groove 39 and, effectively, precludes the entrance of grass and dirt within the wheel 31.

Figure 2:
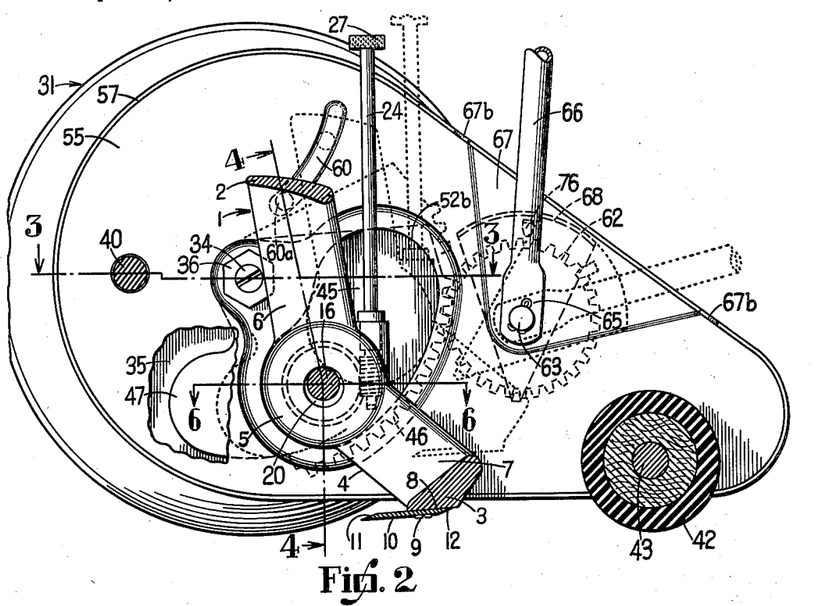
Figure 2 is a vertical sectional view taken through the mower substantially along line 2—2 of Figure 3.

It will be noted from Figure 2, that the side plates 35 are of substantially triangular form with their wider ends forward. However, the forward and rear ends are of arcuate form. The two plates are rigidly secured together adjacent their forward ends by means of the bumper bar 40 which extends transversely the full width of the mower ahead of the cutting reel 13. Each end of the bumper bar 40 (Figure 3) is reduced and extends through aligning openings in the side plate 35 and the cover plate 37. A clamping nut 41 is threaded on the reduced end of the bar 40 and clamps the plates 35 and 37 against each other and to the bar 40. The rear and lower ends of the side plates 35 carry the ground-engaging roller 42. The roller 42 is carried rotatably by a transversely extending shaft 43 that has reduced ends, each of which extends into an opening in the side plate 35 and is clamped thereto by means of a clamping nut 44. Thus, the plates 35 are rigidly connected together at their forward and rear ends by means of the bumper bar 40 and the roller shaft 43. Furthermore, as will be apparent hereinafter, the yoke 1 cooperates with the side plates 35 to increase this rigidity.

In order to provide for proper adjustment to vary the depth or height of the cutting reel 13 and associated cutter bar knife 10, I provide means for vertically adjusting the yoke 1. This adjustment is accomplished while maintaining substantially constant the angle of the cutter bar knife 10 relative to the ground. The yoke 1 and, therefore, the cutting reel 13 and the knife 10 which are carried by the yoke are moved vertically relative to the wheels 31. To accomplish this each end of the yoke 1 is carried by a gear segment 45 as illustrated in Figures 1 to 4, inclusive, and 6. Each gear segment 45 is vertically disposed and is mounted directly inside the side plate 35, having its wide curved edge formed with the gear teeth 46, such edge being disposed rearwardmost. The lower edge of the gear segment 45 is provided with a forwardly and downwardly directed extension or ear 47 which is provided for a purpose to be explained later. The gear segment 45 is pivoted at its forward end for swinging movement in a vertical plane about the axis of the wheel axle 33. The nut 36, threaded on the axle 33, is provided with a reduced bearing sleeve portion 48 which is disposed in a pivot opening formed in the forward edge of the segment 45. The enlarged part of the nut 36 prevents lateral inward movement of the segment. Thus, each segment 45 is mounted for vertical swinging movement relative to the adjacent plate 35 and about the axis of the wheel axle 33.

As previously indicated, the yoke 1 is carried by the gear segments 45 so that it will be adjusted vertically upon vertical swinging movement of the gear segments. Thus, as shown in Figure 4, the exterior of each bearing cup 5 formed on the yoke 1 is provided adjacent its outer side with a reduced shouldered bearing 49. The bearing 49 fits into an opening formed in the segment 45 and is free to rotate therein. The bearing 49 is formed on the exterior of an outwardly directed interiorly threaded sleeve extension 50 provided on the bearing cup 5. This extension is provided on its exterior surface at a point spaced just outwardly beyond the bearing 49, with a shouldered annular guide surface 51. This annular guide surface fits into and engages the edges of an arcuate slot 52 (Figure 4) which is formed in the side plate 35. This slot is concentric with the axis of the wheel axle 33 and extends from a point just behind the axis to a point just above the axis. An aligning arcuate slot 52a is also provided in the plate 37 as shown in Figure 4. Threaded into the sleeve extension 50 of the bearing cup 5 is a nut 53 (Figure 4). This nut 53 has its inner edge engaging the eccentric 18 and serving to hold it in the bearing cup. The outer edge of the nut is provided with an outwardly extending peripheral flange 54. This flange 54 extends beyond the edges of the aligning slots 52 and 52a. Within the side plate 35, there is provided a cover plate 55. This plate 55 is similar in outline to the plate 35 and is provided with an outwardly directed peripheral flange 56 (Figure 3) which extends within and closely adjacent the inwardly directed peripheral flange 57 provided on the plate 35. It will be apparent that the cover plate 55 and the cooperating flanges 56 and 57 serve to prevent grass and dirt from reaching the gear segment 45 and associated parts. The plates 55 are provided with openings through which the bumper bar 40 passes and with similar openings through which the roller shaft 43 passes. Furthermore, the plate 55 is provided with an arcuate slot 52b (Figures 1, 4 and 6) which is in substantial alignment with the slots 52a and 52 formed, respectively, in the plates 37 and 35. The slot 52b in plate 55 receives the shouldered guide portion 58 formed on the exterior of the bearing cup 5.

Figure 3:
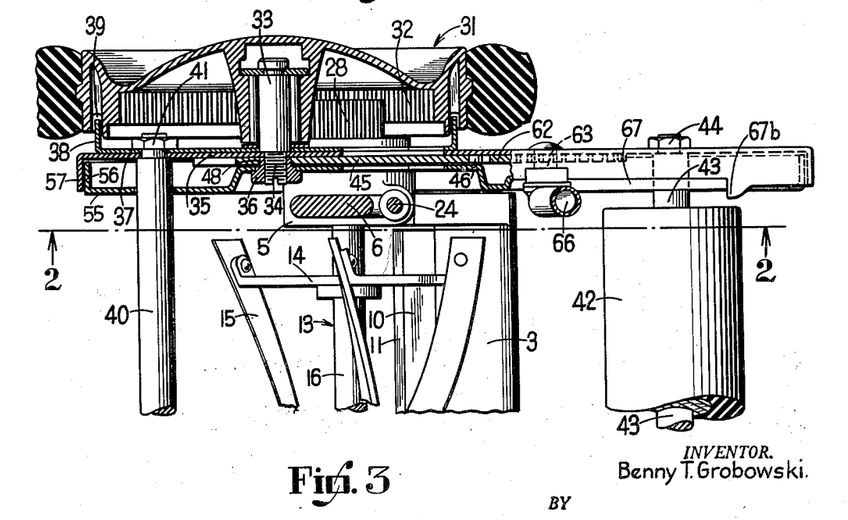
Figure 3 is a horizontal sectional view taken substantially along line 3—3 of Figure 2.
Figure 4:
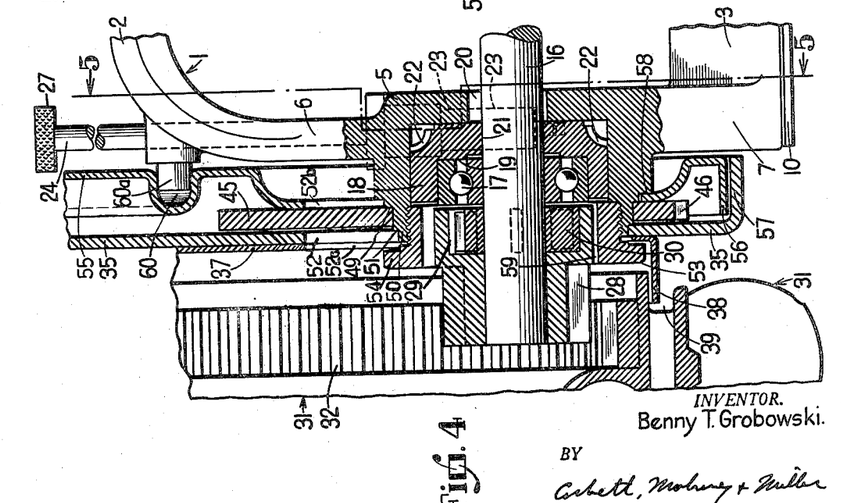
Figure 4 is a vertical sectional view taken substantially along line 4—4 of Figure 2, illustrating the end of the yoke structure and the eccentric adjusting structure associated therewith.
Figures 5, 6:
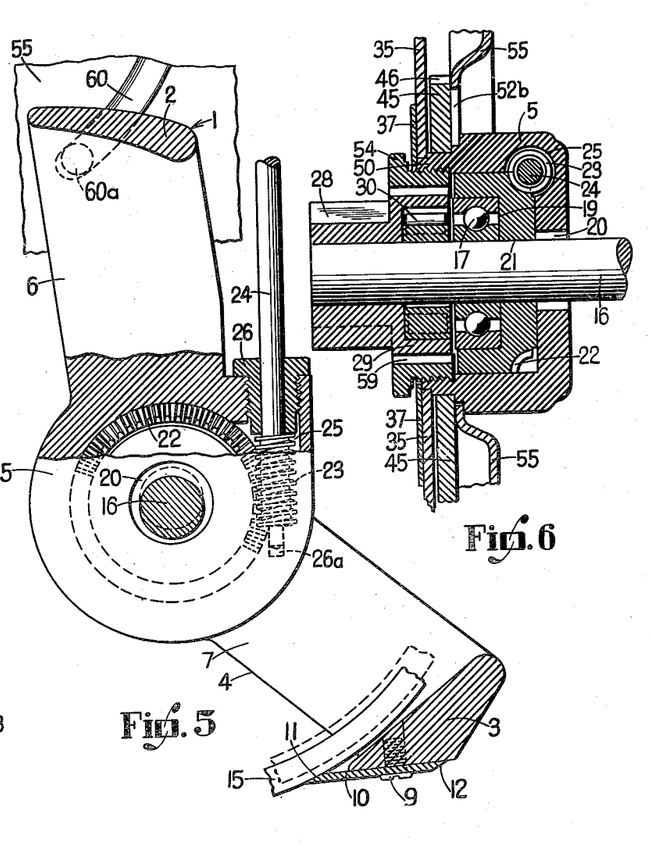
Figure 5 is a vertical sectional view taken substantially along line 5—5 of Figure 4.
Figure 6 is a horizontal sectional view taken through the eccentric adjusting structure substantially along line 6—6 of Figure 2.
Figure 7:
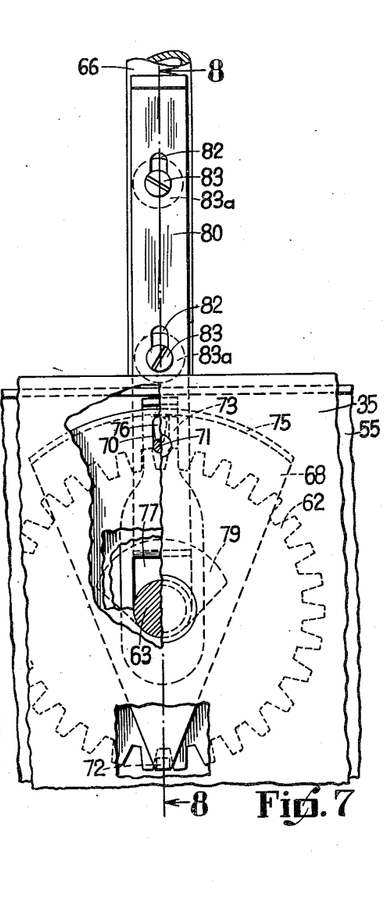
Figure 7 is a view in elevation, partly broken away, showing the inner surface of one of the side plates and illustrating the gear segment operating pinion associated therewith and the locking means associated with the pinion.

It will be noted best from Figures 3, 4 and 6 that in assembling the structure of each side of the mower, the plate 55 is first positioned by slipping the slot 52b over the guide portion 58 of the bearing cup 5. Next the gear segment 45 is slipped over the bearing 49 formed on the exterior of the bearing segment. The plate 35 is then positioned on the guide portion 51 formed on the bearing, the guide portion extending into the slot 52 of the side plate. The wheel cover plate 37 is then positioned adjacent the side plate 35 and the wheel axle is clamped to the plates 35 and 37, the clamping nut 36 serving to pivotally mount the gear segment 45. At the same time that the structures at each side of the mower are assembled, the opposite ends of the bumper bar 40 and the roller shaft 43 are properly positioned in the plates 35 and 55 and are clamped thereto. Thus, a complete rigid structure will be assembled. The rigidity is increased by the yoke I due to the fact that the nuts 53, which are threaded into the cups 5 carried by the yoke, are provided with the flanges 54 which overlap the plates 37 and 35. Thus, the flanges 54 will prevent lateral displacement of the side plates and associated parts. Consequently, extreme rigidity of the entire mower structure will result.

It will be noted from Figures 4 and 6 that the nut 53 is provided with an interior chamber 59 which receives the clutch housing 29. This chamber 59 is of larger diameter than the housing 29 in order to permit the required lateral displacement of the axis of the shaft 16 when the eccentrics 18 are rotated. Obviously, this lateral displacement also causes similar displacement of the pinion 28. However, the displacement necessary to obtain the precision adjustment of the cutting reel 13 relative to the cutter bar knife 10 is very slight and will not move the pinion out of mesh with the ring gear 32 of the wheel 31.

From the above description it will be apparent that when the gear segments 45 are swung vertically about the axes of the wheel axles 33, the yoke I will be moved vertically. The extensions 50 of the bearing cups 5 will move along the aligning slots 52a, 52 and 52b formed in the plates 37, 35 and 55, respectively. Thus, the cutting reel 13 and the cooperating cutting knife 10, which are both carried by the yoke, will be moved to different vertical positions to vary the height of cut of the mover. The arcuate slots will always be covered by the gear segments 45 even when the gear segments are moved to their extreme vertical positions, due to the provision of the ears 47 which will extend downwardly in covering relationship to the forward ends of the slots. Thus, the entrance of dirt and grass through the arcuate slots into the wheels 31 will be precluded even if some of this extraneous material does get between the plates 35 and 55. It will be apparent that when the gear segments 45 are swung vertically to move the yoke I vertically, the pinions 28, carried by cutting reel shaft 16, are also moved through arcuate paths. However, this will not interfere with meshing of the pinions 28 with the internal gears 32 of the wheels, due to the fact that the centers of the arcuate paths of movement of the pinions coincide with the axes of the wheel axles 33 which are, of course, the centers of the ring gears 32.

As previously indicated, it is desirable to maintain the cutter knife 10 at substantially the same angle relative to the ground, regardless of the vertical position of the yoke 1. To accomplish this, as shown best in Figures 1, 2 and 4, an arcuate guide groove 60 is formed in the inner surface of each cover plate 55 at a point above and slightly behind the wheel axle 33. The yoke I carries at each side thereof a guide pin 60a which extends into the cooperating groove 60. The pins 60a are carried by the vertical portions 6 of the side arms 4 of the yoke adjacent the upper ends thereof. The grooves 60 are so disposed relative to the arcuate slots along which the bearing cups 5 move, that during vertical movement of the yoke I, the portions 6 of the side arms will remain upright due to the pins 60a operating in the grooves 60. During vertical swinging movement of the gear segments 45, the extensions 50 of the bearing cups 5 will rotate in the gear segments. Thus, the angle of the knife 10 relative to the ground will be maintained throughout vertical adjustment thereof.

Figure 8:
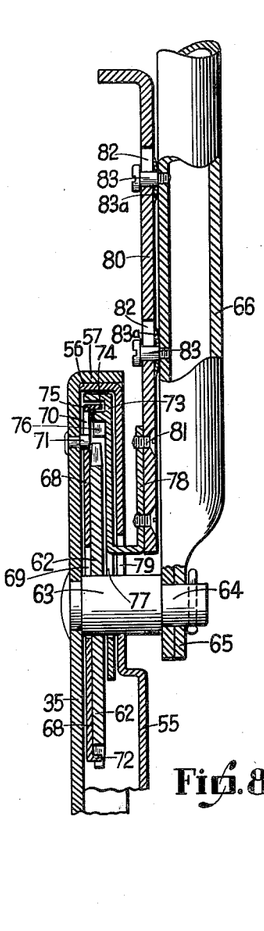
Figure 8 is a vertical sectional view taken substantially along line 8—8 of Figure 7.
Figure 9:
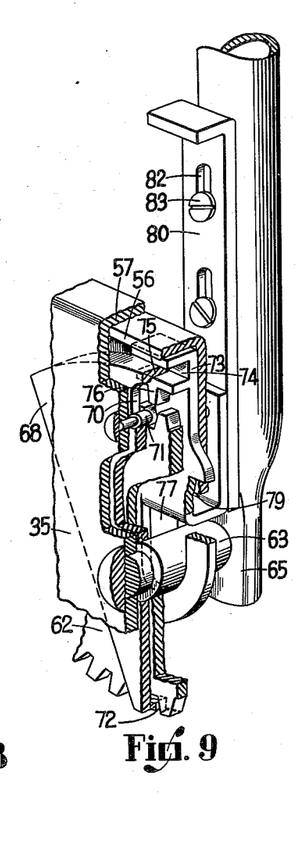
Figure 9 is a perspective view, partly broken away, of the structure shown in Figures 7 and 8.

For swinging the gear segments 45 about the wheel axles 33 to obtain the vertical adjustment of the yoke I, I provide the structure illustrated best in Figures 1 to 3, and 7 to 9. As indicated in these figures, an operating pinion 62 is associated with each of the gear segments 45 and is in mesh with the gear teeth 46 thereof. Each pinion 62 is rotatably carried on a pin 63 which is secured in an opening formed in the side plate 35 as shown in Figure 8. This pin extends inwardly and its inner end is reduced as at 64 to provide a trunnion for the lower flattened end 65 of a handle arm 66. The handle arm 66 may be of any suitable structure but is shown as being formed from a tube. The arms 66 of the handle are of such outline that their lower ends are disposed on opposite sides of the mower. The lower ends of arms 66 are disposed for limited swinging movement in pockets 67 (Figure 1) of right-triangular form which are formed in the inner surfaces of plates 55. The arms 66 pass upwardly through notches 67a formed in the flanges 56 at at the upper edges of the plates 55. At both ends of each notch 67a, ears 67b are provided which limit swinging movement of the handle arms 66. Thus, the handle may be used for moving the mower in the usual manner and may be swung to different positions about the pivot pins 63. But the swinging movement will be limited by the ears 67b.

A suitable locking structure is provided for maintaining the pinions 62 in fixed position or for connecting them to the handle arm 66 so that they can be rotated about their axis merely by swinging the handle arms 66. This locking structure comprises a vertically slidable triangular shaped latch member 68 which is disposed directly inside the plate 35 (Figure 8) and which is provided with a vertical slot 69 through which the pin 63 passes. The upper end of the member 68 is provided with a second vertical slot 70 into which a pin 71, carried by plate 35, extends. Thus, pins 63 and 71 maintain the latch 68 at a fixed angle but movable longitudinally along a line between pins 63 and 71. The latch 68 is provided with a locking lug 72 on its lower end which will be disposed between teeth of the pinion when member 68 is in its uppermost position as shown in Figure 8. Thus, at this time, rotation of pinion 62 will be precluded. A second movable latch member 73 is provided on the opposite side of the pinion 62. This latch member is provided with a groove 74 in its upper end which receives a flange 75 formed on the upper end of latch 68. The upper end of latch 73 is provided with a locking lug 76 which can be moved downwardly between teeth of the pinion 62. Upon downward movement of latch 73, the latch 68 will be moved downwardly due to the provision of flange 75 extending into groove 74. Thus, when lug 76 is moved into locking engagement with pinion 62, the lug 72 is moved out of engagement therewith and, vice versa. The latch 73 extends downwardly and is slotted, as at 77, to fit around the pin 63. The latch 73 has an arm 78 which extends outwardly through openings 79, in plate 55, and then vertically.

A vertically disposed operating handle bar 80 is attached to the arm 78 by means of screws 81. This handle 80 extends along the arm 66 of the main handle of the mower and is mounted for vertical movement by means of the vertical slots 82 formed therein and the screws 83 which are threaded into the handle arm 66. Washers 83a are associated with screws 83 and tend to hold bar 80 in either of its positions. Thus, by moving the bar 80, the locking mechanism may be actuated to cause either the lug 72 to engage the pinion and, consequently, prevent the pinion from rotating or to cause the lug 76 to engage the pinion and connect the pinion to the handle arm 66. When the pinions 62 are connected to the handle arms 66, the pinions can be rotated about their axes merely by swinging the handle of the mower about the pivot pins 63. Rotation of the pinions in this manner will swing the gear segments 45 vertically and produce vertical adjustment of the yoke 1. Obviously, the handle will provide considerable leverage and, consequently, the adjustment can be made with ease and without the use of tools. As soon as the adjustment is completed, the bar 80 may be pulled upwardly to release the handle arms 66 from the pinions 62 and to lock the pinions in position by causing the lugs 72 to engage the teeth thereof. Thereafter the handle arms 66 may swing without affecting the pinions 62.

Figures 10, 11, 12:
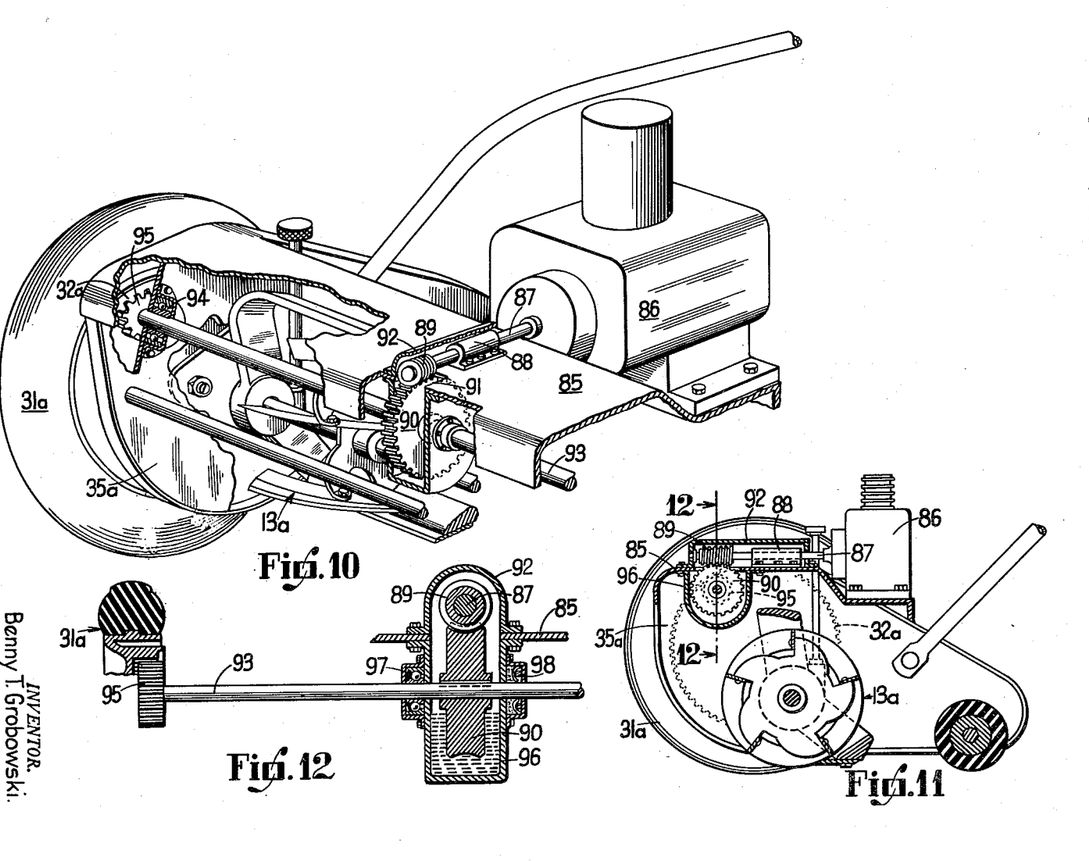
Figure 10 is a perspective view, partly broken away, illustrating the power driven mower constructed in accordance with my invention.
Figure 11 is a view partly in side elevation and partly in vertical section of the mower illustrated in Figure 10.
Figure 12 is a vertical sectional view taken substantially along line 12—12 of Figure 11 and illustrating the wheel driving shaft and associated parts.

In Figures 10 to 12, inclusive, I have illustrated a power driven form of my mower. In the main, the structure of this form of my mower is substantially the same as before. However, in addition, I provide a transversely extending top plate 85 which has its ends suitably fastened to the vertically disposed side plates 35a. Carried by the upper surface of the plate 85 adjacent the rear side thereof is a suitable power unit 86. The drive shaft 87 of this unit extends forwardly and is rotatably carried by a bearing 88 secured to the plate. The forward end of this shaft 87 carries a worm 89 which meshes with the upper end of a vertically disposed worm gear 90 which projects upwardly through a slot 91 formed in the plate 85. A tubular housing 92 encloses the bearing 88 and shaft 87 and is fastened to the plate 85.

The worm gear 90 is keyed on a transversely extending shaft 93. Each end of the shaft 93 is rotatably carried by a ball bearing unit 94 secured to the inner surface of the plate 35a. Each end of the shaft 93 projects through the plate 35a into the wheel 31a. The inner end of the shaft carries a driving pinion 95 which meshes with the ring gear 32a disposed internally of the wheel. It will be noted from Figure 12 that a U-shaped housing 96 encloses the worm gear 90 and is fastened to the lower surface of the plate 85. This housing 96 may contain lubricating oil and has suitable bearings 97 and 98 mounted thereon and through which the shaft 93 passes.

When the unit 86 operates, it drives the shaft 93 through the worm 89 and worm gear 90. The driving force is applied midway between the end of the shaft and is, therefore, evenly distributed on the two wheels without danger of binding. The pinions 95 are driven by the shaft and drive the wheels 31a. The wheels will, in turn, drive the pinions which rotate the cutting reel 13a. This power driving arrangement in no way affects the other functions of the mower, namely, the cutting reel adjustment to the cutter bar knife and the raising and lowering of the yoke 1a to vary the height of cut.

It will be apparent from the above description that I have provided a lawn mower of an extremely rugged construction. The construction is such that the adjustment for varying the height of cut and the adjustment of the cutting reel relative to the cutter bar knife can be accomplished with ease and accuracy without the use of tools. The structure is such that it can be designed either as a manually operated mower or as a power driven mower by slight variations in design. Furthermore, the structure is such that the various gears and similar parts are protected from clogging by dirt or grass.

Various other advantages will be apparent from the preceding description, the drawings and the following claims.

Having thus described my invention, what I claim is:

1. A mower comprising a rigid frame, said frame comprising vertically spaced transverse members and connecting side members rigidly connected together, one of said transverse members being provided with a knife edge, a cutting reel journaled in said side members and adapted to cooperate with said knife edge, side plates associated with the ends of said frame, supporting wheels carried by said side plates, means for supporting said frame for movement about the axes of said wheels and including gears carrying said frame and pivoted to said side plates at the axes of said wheels, and means for moving said gears to selected positions about said axes.

2. Apparatus according to claim 1 wherein said frame supporting means comprises segmental gears pivoted to said side plates for movement about the axes of said wheels.

3. Apparatus according to claim 1 wherein said frame supporting means comprises segmental gears pivoted to said side plates for movement about the axes of said wheels, and wherein said means for moving said gears comprises pinions rotatably carried by said side plates and meshing with said segmental gears, and means for rotating said pinions simultaneously.

4. Apparatus according to claim 1 wherein said frame supporting means comprises segmental gears pivoted to said side plates for movement about the axes of said wheels, and wherein said means for moving said gears comprises pinions rotatably carried by said side plates and meshing with said segmental gears, and means for rotating said pinions simultaneously, said means comprising a mower handle which is pivoted to said side plates for vertical swinging movement, and locking means associated with said pinions for selectively preventing rotation thereof or connecting them to the handle so that vertical movement of the handle will produce rotation thereof.

5. A mower comprising a rigid frame, said frame comprising vertically spaced transverse members and connecting side members rigidly connected together, one of said transverse members being provided with a knife edge, a cutting reel for cooperating with said knife edge and including a shaft, means for journaling the ends of said shaft in said side members, vertically disposed side plates associated with the ends of said frame, supporting wheels carried by said side plates, each of said wheels being provided with an internal gear, means for supporting said frame so that the axis of said reel shaft can be moved about the axes of said wheels, each end of said shaft projecting through an arcuate slot formed in each of said side plates and carrying a pinion engaging the internal gear of the wheel, means for moving said frame to selected positions about said axes, and means for maintaining substantially constant the angle of said frame relative to the ground regardless of the vertical position thereof.

6. Apparatus according to claim 5 wherein said frame supporting means comprises segmental gears pivoted to said side plates for movement about the axes of said wheels, the ends of said shaft also passing through openings formed in said gear segments and being rotatable therein, said means for moving said frame comprising pinions rotatably carried by said side plates and meshing with said segmental gears, and means for rotating said pinions simultaneously, said means comprising a mower handle which is pivoted to said side plates for vertical swinging movement, and locking means associated with said pinions for selectively preventing rotation thereof or connecting them to the handle so that vertical movement of the handle will produce rotation thereof.

7. Apparatus according to claim 5 wherein said means for maintaining the angle of the frame comprises pins extending from the ends of said frame, and guide grooves formed in said side plates and into which said pins extend.

8. A mower comprising a rigid yoke, said yoke comprising vertically spaced transverse members and connecting side members rigidly connected together, the lower of said transverse members being provided with a knife edge, a cutting reel for cooperating with said knife edge and including a shaft, means for journaling the ends of said shaft including bearing cups on said side members, vertically disposed side plates associated with the ends of said yoke and including inner and outer plates spaced from each other, supporting wheels carried by said side plates, each of said wheels being provided with an internal gear and an inner cover plate, means for supporting said yoke so that the axis of said cutting reel shaft can be moved about the axes of said wheels, each end of said shaft extending through aligning arcuate slots formed in the side plates and the wheel cover plates and carrying a pinion engaging the internal gear of the wheel, said bearing cups also extending into said aligning arcuate slots in said side plates and carrying a mmeber which extends over the outer surface of the outer plate, said yoke supporting means comprising segmental gears mounted between the inner and outer plates of the side plates and pivoted thereto for movement about the axes of said wheels, the ends of said shaft also passing through openings formed in said segmental gears and being rotatable therein, means for moving said yoke comprising pinions rotatably carried between the inner and outer plates of said side plates and meshing with said segmental gears, means for rotating said pinions simultaneously including a mower handle which is pivoted to said side plates for vertical swinging movement, locking means associated with said pinions for selectively preventing rotation thereof or connecting them to the handle so that vertical movement of the handle will produce rotation thereof, and means for maintaining substantially constant the angle of said yoke relative to the ground regardless of the vertical position thereof, said means comprising guide pins carried by the ends of the yoke at points spaced from the shaft and extending into guide grooves formed in the inner plate of said side plates.

9. Apparatus according to claim 5 including a supporting plate supported by said side plates, a power unit carried by said plate, a drive shaft extending transversely of the mower through said side plates and into said wheels, driving pinions carried by said shaft and engaging the internal gears of said wheels, and a driving connection between said drive shaft and said power unit.

10. Apparatus according to claim 9 wherein said driving pinions simultaneously rotate both wheels, and wherein said driving connection includes a worm and gear.

11. A mower comprising a chassis carried by wheels, a frame carried by the chassis and supporting the cutting reel and associated cutter knife of the mower, means for adjusting said frame vertically relative to the chassis, said means comprising gears which carry the frame and which are mounted on the chassis for movement about the axes of said wheels and means for moving said gears about said axes.

12. A mower according to claim 11 wherein a connection is provided between said frame and said chassis for maintaining substantially constant the angle of said cutter knife relative to the ground regardless of the vertical position of said frame.

13. A mower according to claim 12 wherein said connection between said frame and said chassis comprises a pin and slot connection.

14. A mower according to claim 11 wherein said means for moving said gears comprise pinions rotatably carried by the chassis and meshing with said gears, means for rotating said pinions, and releasable locking means for normally preventing rotation of said pinions.

BENNY T. GROBOWSKI.

REFERENCES CITED

The following references are of record in the file of this patent:

UNITED STATES PATENTS

| Number | Name | Date |
|---|---|---|
| 1,802,304 | Anderson | Apr. 21, 1931 |
| 1,836,386 | Nichols et al. | Dec. 15, 1931 |
| 2,197,264 | Cooper | Apr. 16, 1940 |
| 2,260,801 | Clemson | Oct. 28, 1941 |
| 2,300,461 | O'Dell et al. | Nov. 3, 1942 |
| 2,340,849 | Wildeboor et al. | Feb. 8, 1944 |
| 2,398,300 | Frazier | Apr. 9, 1946 |

FOREIGN PATENTS

| Number | Country | Date |
|---|---|---|
| 113,287 | Australia | June 19, 1941 |